United States Patent
Rahamim et al.

(10) Patent No.: US 6,665,400 B1
(45) Date of Patent: Dec. 16, 2003

(54) LOW-VOLTAGE TRANSISTOR CIRCUIT FOR SUPPRESSING HIGH-VOLTAGE SURGES IN A TELEPHONE LINE INTERFACE CIRCUIT

(75) Inventors: Rafi Rahamim, Orange, CA (US); Brian Stroud, Santa Ana, CA (US)

(73) Assignee: PCTEL, Inc., Chicago, IL (US)

(*) Notice: Subject to any disclaimer, the term of this patent is extended or adjusted under 35 U.S.C. 154(b) by 0 days.

(21) Appl. No.: 09/298,667

(22) Filed: Apr. 23, 1999

(51) Int. Cl.[7] ................................. H04M 1/00
(52) U.S. Cl. ................... 379/399.01; 379/412
(58) Field of Search ................ 379/412, 399.01, 379/93.36, 93.05, 377; 361/111, 118

(56) References Cited

U.S. PATENT DOCUMENTS

| | | | | |
|---|---|---|---|---|
| 4,213,061 A | * | 7/1980 | Conner | 307/116 |
| 4,465,903 A | * | 8/1984 | Barber | 379/93.05 |
| 4,634,814 A | * | 1/1987 | Pommer, II | 379/377 |
| 5,315,651 A | * | 5/1994 | Rahamim et al. | 379/412 |
| 5,414,587 A | * | 5/1995 | Kiser et al. | 361/118 |
| 5,875,235 A | * | 2/1999 | Mohajeri | 379/93.36 |
| 6,031,705 A | * | 2/2000 | Gscheidle | 361/111 |
| 6,061,445 A | * | 5/2000 | Rahamim et al. | 379/412 |
| 6,088,446 A | * | 7/2000 | Huang | 379/412 |

* cited by examiner

Primary Examiner—Minsun Oh Harvey
Assistant Examiner—Jefferey Harold
(74) Attorney, Agent, or Firm—Farjami & Farjami LLP

(57) ABSTRACT

A relay-less telephone line interface circuit is disclosed which incorporates a low-voltage transistor to suppress high-voltage, short-term voltage surges. Specifically, a low-voltage transistor such as a Central Semiconductor C2TA44, a Motorola MPSA42, or similar such transistors actually can withstand a high-voltage spike exceeding the manufacturers specified parameters. The present circuit exploits this undocumented feature by employing such a transistor in combination with a metal oxide varistor in order to provide adequate voltage surge protection for the interface circuit. Thus, a zenor diode is not necessary (avoiding on-hook problems) and the relay-less circuit still passes the FCC Part 68 test.

18 Claims, 1 Drawing Sheet

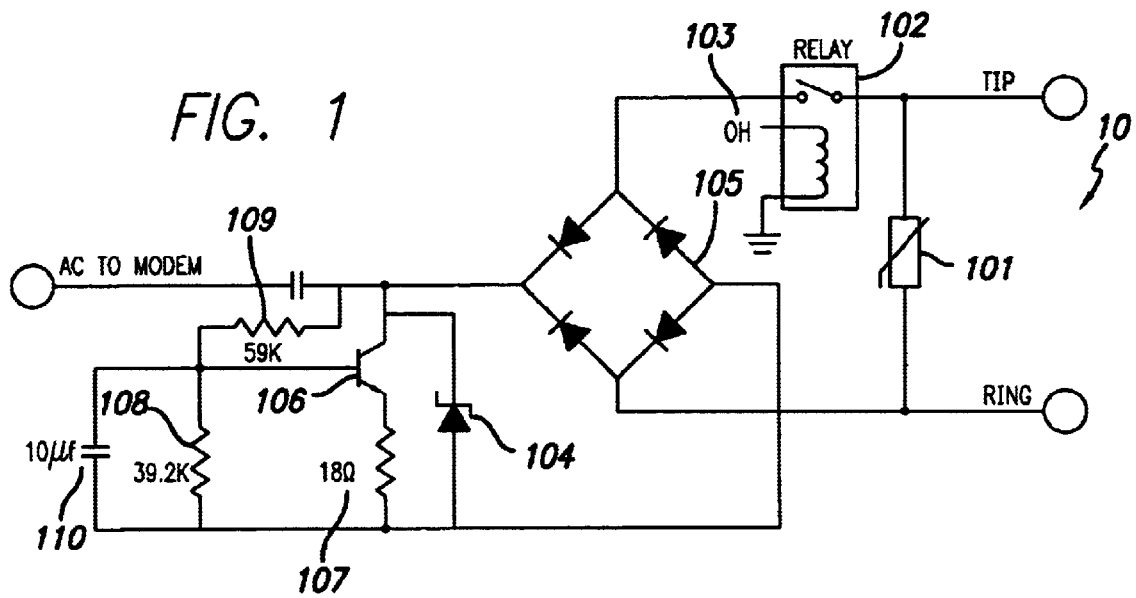
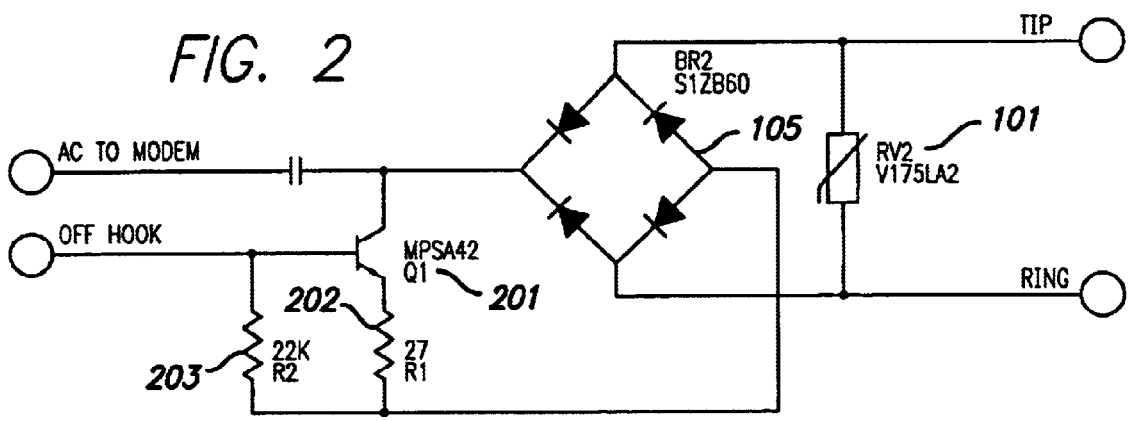
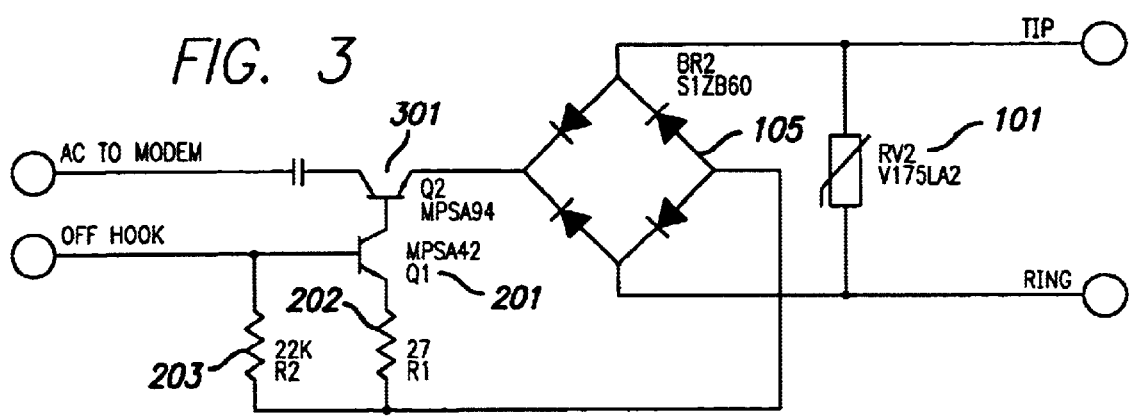

LOW-VOLTAGE TRANSISTOR CIRCUIT FOR SUPPRESSING HIGH-VOLTAGE SURGES IN A TELEPHONE LINE INTERFACE CIRCUIT

BACKGROUND OF THE INVENTION

1. Field of the Invention

The present invention relates generally to the field of modem circuits, and more particularly, to a telephone line interface circuit incorporating low-voltage transistors to suppress high-voltage, short-term voltage surges.

2. Description of Related Art

FIG. 1 illustrates a typical prior-art telephone line interface circuit 10 for use in a modem circuit. Before the modem accesses the telephone line, the telephone line interface circuit 10 is normally in an "on-hook" state, meaning that the modem circuit is disconnected from the telephone line. In order for the modem to go "off-hook" (i.e. access the telephone line), an off-hook signal "OH" 103 is applied to a relay switch 102. The transistor 106 draws a loop current sufficient to notify the telephone system that the modem is now off-hook. When the circuit is on-hook, the relay 102 effectively isolates the transistor from the telephone line, and any high-voltage surges as well. Thus, the transistor 106 only needs to be protected from high-voltage surges when the modem is off-hook.

High-voltage surges on telephone lines may result from, for example, lightening strikes. These strikes can be simulated using test pulses of approximately 800 V for relatively short periods. Such high-voltage spikes or surges could easily damage unprotected equipment connected to a telephone line. Therefore, the FCC requires all products intended for use with the telephone system to pass a "Part 68" high-voltage pulse test.

As a first level of protection against high-voltage surges on the telephone line, a 400 V peak (175 V RMS) MOV (metal oxide varistor) 101 is placed across the tip and ring lines of the circuit of FIG. 1 to dissipate any voltage surges. However, a 400 V peak surge would still likely exceed the limits of the transistor 106. Therefore, a zenor diode 104 (typically 13 V) is also placed across the transistor 106 to provide an extra level of protection.

This voltage surge protection scheme works well for a telephone line interface circuit incorporating a relay 102. However, newer telephone line interface circuits have eliminated the relay 102 in order to reduce the size and cost of the interface circuitry. Merely placing a zenor diode 104 across the transistor 106 is no longer a valid option, since without a relay switch, the zenor diode 104 will constantly draw loop current and the modem could never go on-hook. Also, using a high-voltage transistor capable of withstanding a high-voltage surge is not practical, since high-voltage transistors do not provide adequate signal distortion performance. Also, for a given design, only a single vendor's transistor could be incorporated to provide adequate voltage and distortion characteristics. Thus, there is a need for a high-voltage surge protection design for use with relay-less telephone line interface circuits.

SUMMARY OF THE INVENTION

The present invention is a telephone line interface circuit incorporating low-voltage transistors to suppress high-voltage, short-term voltage surges. Specifically, a low-voltage transistor such as a Central Semiconductor C2TA44, a Motorola MPSA42, or similar such transistors actually can withstand a high-voltage spike exceeding the manufacturers specified parameters. The present invention exploits this undocumented feature by employing such a transistor in combination with a metal oxide varistor in order to provide adequate voltage surge protection. Thus, a zenor diode is not necessary (avoiding on-hook problems) and the relay-less circuit still passes the FCC Part 68 test.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein:

FIG. 1 is a schematic drawing of a prior-art telephone line interface circuit;

FIG. 2 is a schematic drawing of a first embodiment of the present invention; and FIG. 3 is a schematic drawing of a second embodiment of the present invention.

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a telephone line interface circuit incorporating low-voltage transistors to suppress high-voltage, short-term voltage surges.

Referring now to FIG. 2, a first embodiment of the present invention will be described. The circuit of FIG. 2 is similar to FIG. 1, but lacks a relay 102 and the zenor diode 104. The off-hook signal is applied directly to the base of the loop current transistor 201, thus eliminating the need for the relay. A first resistor 202 is connected to the emitter of the transistor 201 and in the preferred embodiment is a 27106 resistor. A second resistor 203 is connected between the base of the transistor 201 and an opposite end of the first resistor 202. In the preferred embodiment, the second resistor 203 is a 22kΩ resistor, but those skilled in the art can determine the most appropriate values for a given application.

The present inventors have determined that a low-voltage transistor 201 may be used in the telephone line interface circuit and still meet the FCC Part 68 test. Specifically, a low-voltage transistor such as a Central Semiconductor C2TA44, a Motorola MPSA42, or similar such transistors actually can withstand a high-voltage spike exceeding the manufacturers specified parameters. For example, a transistor rated for only approximately 200–330 V can actually withstand short-term voltage surges of up to 400 V.

The present invention exploits this undocumented feature as shown in FIG. 2. A 175 VRMS MOV 101, such as a Harris V175LA2 or a Phillips ECG1V175, decreases the voltage of any FCC Part 68 test pulse to around 400 V peak. Laboratory tests have shown that the transistor 201 can easily handle the extra voltage without breaking down. The zenor diode 104 is thus not necessary (avoiding on-hook problems) and the relay-less circuit still passes the FCC Part 68 test. Therefore, the present invention provides a telephone line interface circuit incorporating low-voltage transistors, which is still able to suppress high-voltage, short-term voltage surges. The main advantages of this circuit over the prior-art circuits include lower cost, wider availability of transistors, and lower distortion that increases the modem performance (as compared to higher voltage transistors).

A second embodiment of the present invention is illustrated in FIG. 3. This circuit is similar to the circuit in FIG. 2, except an additional transistor 301 is added to provide increased isolation for the AC modem when the device is on-hook.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A telephone line interface circuit capable of suppressing high-voltage surges, the circuit connecting to a tip line and ring line of a telephone system and consisting of:
   a metal oxide varistor (MOV) connected between the tip line and the ring line;
   a diode bridge having a first node connected to the tip line and a second node connected to the ring line; and
   a low-voltage loop current transistor connected to the diode bridge, wherein the low-voltage loop current transistor suppresses short-term high-voltage surges across the tip line and the ring line.

2. The circuit of claim 1, wherein the low-voltage transistor is a Motorola MPSA42 transistor.

3. The circuit of claim 1, wherein the low-voltage transistor is a Central Semiconductor C2TA44 transistor.

4. The circuit of claim 1, further consisting of:
   a first resistor connected between an emitter of the transistor and a third node of the diode bridge;
   a second resistor connected between a base of the transistor and a node formed by the first resistor and the third node of the diode bridge;
   an off-hook signal input line connected to a base of the transistor; and
   an AC signal line connected to a collector of the transistor and a fourth node of the diode bridge.

5. The circuit of claim 4, wherein the first resistor is 27Ω and the second resistor is 22 kΩ.

6. The circuit of claim 5, wherein the MOV is a Harris V175LA2, Phillips ECG1V175 or equivalent.

7. The circuit of claim 4, wherein a second transistor has a base connected to the collector of the transistor, a collector connected to the AC signal line, and an emitter connected to the fourth node of the diode bridge.

8. The circuit of claim 7, wherein the second transistor is an MPSA94.

9. The circuit of claim 4, wherein the circuit meets the requirements of the FCC Part 68 pulse test.

10. A method for suppressing high-voltage surges in a relay-less telephone interface circuit comprising the steps of:
    connecting a metal oxide varistor (MOV) between a tip line and a ring line; and
    connecting a first node of a diode bridge to the tip line and connecting a second node of the diode bridge to the ring line;
    connecting a low-voltage loop current transistor to a third node of the diode bridge, wherein the low-voltage loop current transistor suppresses short-term high-voltage surges across the tip line and the ring line.

11. A telephone line interface circuit capable of suppressing high-voltage surges, the circuit connecting to a tip line and ring line of a telephone system and comprising:
    a metal oxide varistor (MOV) connected between the tip line and the ring line;
    a diode bridge having a first node connected to the tip line and a second node connected to the ring line;
    a low-voltage loop current transistor connected across the diode bridge;
    a first resistor connected between an emitter of the transistor and a third node of the diode bridge;
    a second resistor connected between a base of the transistor and a node formed by the first resistor and the third node of the diode bridge;
    an off-hook signal input line connected to a base of the transistor; and
    an AC signal line connected to a collector of the transistor and a fourth node of the diode bridge;
    wherein the low-voltage loop current transistor suppresses short-term high-voltage surges across the tip line and the ring line.

12. The circuit of claim 11, wherein the low-voltage transistor is a Motorola MPSA42 transistor.

13. The circuit of claim 11, wherein the low-voltage transistor is a Central Semiconductor C2TA44 transistor.

14. The circuit of claim 11, wherein the first resistor is 27Ω and the second resistor is 22 kΩ.

15. The circuit of claim 14, wherein the MOV is a Harris V175LA2, Phillips ECG1V175 or equivalent.

16. The circuit of claim 11, wherein a second transistor has a base connected to the collector of the transistor, a collector connected to the AC signal line, and an emitter connected to the fourth node of the diode bridge.

17. The circuit of claim 16, wherein the second transistor is an MPSA94.

18. The circuit of claim 11, wherein the circuit meets the requirements of the FCC Part 68 pulse test.

* * * * *